United States Patent [19]

Campbell

[11] 3,876,716

[45] Apr. 8, 1975

[54] DEHYDROCHLORINATION OF CHLORINATED COMPOUNDS

[75] Inventor: John B. Campbell, Hockessin, Del.

[73] Assignee: E. I. du Pont de Nemours and Company, Wilmington, Del.

[22] Filed: Jan. 26, 1973

[21] Appl. No.: 326,954

Related U.S. Application Data

[63] Continuation-in-part of Ser. No. 712,895, Feb. 28, 1968, abandoned.

[52] U.S. Cl.............................. 260/655; 260/654 D
[51] Int. Cl.............................................. C07c 21/20
[58] Field of Search........................ 260/655, 654 D

[56] References Cited
UNITED STATES PATENTS

| | | | |
|---|---|---|---|
| 2,430,016 | 11/1947 | Hearne et al. | 260/655 |
| 2,999,888 | 9/1961 | Crocker et al. | 260/655 |

*Primary Examiner*—Delbert E. Gantz
*Assistant Examiner*—Joseph A. Boska

[57] ABSTRACT

The rate of dehydrochlorination of certain chlorinated aliphatic hydrocarbons by reaction with an alkali metal hydroxide in an aqueous medium is accelerated and production of unwanted by-products is minimized by having present in the aqueous medium a catalytic amount of an amine oxide of a specified class.

8 Claims, No Drawings

DEHYDROCHLORINATION OF CHLORINATED COMPOUNDS

REFERENCE TO PRIOR APPLICATION:

This application is a continuation-in-part of my prior U.S. application Ser. No. 712,895, filed Feb. 28, 1968 and now abandoned.

BACKGROUND OF THE INVENTION

It is known to dehydrohalogenate halogen-containing compounds by reaction with aqueous alkali. Chloroprene (2-chloro-1,3-butadiene) can conventionally be prepared by dehydrochlorinating 3,4-dichloro-1-butene with aqueous alkaline solution such as aqueous sodium hydroxide or potassium hydroxide. Representative procedures are disclosed in Hearne et al. U.S. Pat. No. 2,430,016 and Crocker et al. U.S. Pat. No. 2,999,888, both of which disclose processes for said dehydrohalogenation utilizing no catalyst. These known processes are characterized by relatively low reaction rates and relatively high yields of unwanted by-products. There has been a need for a dehydrohalogenation process of relatively high reaction rate, increased conversion and a decrease of undesirable by-products, such as, for example, 1-chloro-1,3-butadiene (α-chloroprene) when 3,4-dichlorobutene is dehydrochlorinated.

SUMMARY

In accordance with this invention there is provided an improvement in the aqueous process for dehydrochlorinating chlorinated aliphatic hydrocarbons selected from the group consisting of 3,4-dichloro-1-butene; 2,3,4-trichloro-1-butene; and 1,2,3,4-tetrachlorobutane. The process involves conducting the dehydrochlorination by reaction with an alkali metal hydroxide in aqueous medium in the presence of a catalytic amount of an amine oxide. Usually the amount of amine oxide will be about 0.1–10 percent by weight based on the weight of the chlorinated compound which is being dehydrohalogenated. By operating in accordance with the present invention very substantial increases in reaction rate are obtained and production of unwanted by-products is confined to a minimum.

DESCRIPTION OF THE PREFERRED EMBODIMENTS:

The amine oxides used in practicing the invention either are:

A. tertiary amine oxides having the general structure $R^1R^2R^3NO$, where $R^1$, $R^2$ and $R^3$ are the same or different radicals selected from (a) unsubstituted hydrocarbon radicals of 1 to 20 carbon atoms, or (b) substituted aliphatic hydrocarbon radicals wherein the substitution consists of hydroxy, alkoxy, or carboxamide radicals in positions no closer to the N atom than the beta position, the alkyl group of a said alkoxy substituent radical containing from 1 to 20 carbon atoms and the carboxamide radical being selected from the group consisting of

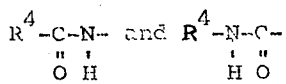

radicals, $R^4$ being alkyl or alkenyl hydrocarbons containing 1 to 20 carbon atoms, or (c) aliphatic radicals of the formula

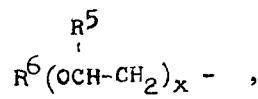

where $R^6$ is hydrogen or $R^1$ as defined in (a) or (b), $R^5$ is hydrogen or methyl, and $x$ is 2 to 15; or are B. heterocyclic amine oxides selected from the group consisting of pyridine-N-oxide; $NR^7$ piperidine-N-oxide; $NR^7$ morpholine-N-oxide; and $NR^7$-pyrrolidine-N-oxide, where $R^7$ is an aliphatic hydrocarbon radical of 1 to 20 carbon atoms.

The organic radicals on the nitrogen can be aliphatic or aromatic hydrocarbon radicals, preferably no more than two of the radicals directly attached to the nitrogen being aromatic. The aliphatic hydrocarbon radicals can be cyclic or acyclic, branched or unbranched. The aliphatic radicals can be substituted with aromatic rings, or the aromatic rings can be substituted with aliphatic radicals. Thus, the R radicals include such groups as alkyl, alkenyl, aryl, aralkyl, and alkaryl, and the alkyl or alkenyl radicals may include both cyclic and acyclic species.

The hydrocarbon radicals can be substituted with functional groups which do not interfere with the reaction. Examples of suitable substituents are hydroxy, alkoxy, aryloxy, acylamido

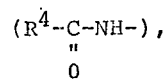

and alkylaminocarbonyl

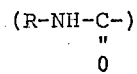

radicals in which $R^4$ and $R^5$ are alkyl or alkenyl hydrocarbon radicals containing up to 20 carbon atoms. In addition, the aliphatic radicals may contain a plurality of intralinear ether atoms, that is, oxa atoms (—O—) separated from each other and the nitrogen by at least two carbon atoms. Representative of these radicals are radicals of the type

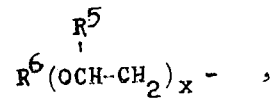

wherein $R^6$ is hydrogen or an aliphatic hydrocarbon radical of the same type as $R^1$, $R^2$ or $R^3$ above, $R^5$ is hydrogen or methyl, and $x$ is 2 to 15 representing the number of the units in the chain. Typically these units are derived from ethylene oxide or propylene oxide.

While oxides of lower trialkylamines can be used, such as triethylamine oxide, tributylamine oxide, dimethylpropylamine oxide, diethylhexylamine oxide, triheptylamine oxide, cyclohexydimethylamine oxide, and the like, it is preferred to use an amine oxide in which at least one radical contains an aliphatic chain of at least 8 carbon atoms. Examples of amine oxides of this type which can be utilized, and their preparation, are disclosed in the U.S. Pat. No. 2,169,976. Specific examples include dodecyldimethylamine oxide, decyldimethylamine oxide, octadecenyldimethylamine oxide, (dodecylaminocarbonylmethyl)dimethylamine oxide, (2-oleoylaminoethyl)-diethylamine oxide, and cyclohexylmethyldodecylamine oxide.

Examples of amine oxides containing aromatic rings on the nitrogen or on aliphatic carbon atoms include N,N-diethyl-C-dodecylaniline oxide, N-dodecyl-N-ethylaniline oxide, and benzyldimethylamine oxide.

The catalytic activity of the amine oxide catalysts is enhanced by the presence of a hydroxy or ether group in a position beta to the nitrogen atom. Examples of compounds containing hydroxy groups are bis(2-hydroxyethyl)dodecylamine oxide, bis(2-hydroxyethyl)hexadecenylamine oxide, and the corresponding 2-hydroxypropyl compounds.

When the nitrogen is part of a heterocyclic ring, the ring usually contains 5 to 7 members, as in pyrrolidine, piperidine, pyridine, and morpholine derivatives. Specific examples include pyridine 1-oxide, 1-ethylpiperidine 1-oxide, 4-dodecylmorpholine 4-oxide, and 1-octylpiperidine 1-oxide.

Examples of additional amine oxides in which at least one alkyl chain contains intralinear oxygen atoms and methods for their preparation are disclosed in U.S. Pat. Nos. 3,206,512 and 3,356,727.

For a further discussion and preparation of amine oxides which can be utilized, reference is made to Culvenor, Reviews of Pure and Applied Chemistry 3, 83–114 (1953).

Many of the commercially available amine oxide compositions contain higher fatty alkyl or alkenyl radicals; these compositions are mixtures in which the alkyl groups are derived from the fatty acids obtained from various naturally occurring animal and vegetable oils such as coconut oil and tallow. Compositions of this type can be used in practicing the invention process.

The amount of amine oxide to be used in practicing this invention varies from about 0.1 percent to about 10 percent by weight, based on weight of halogenated compound. Improved rates of reaction can be obtained when using as little as 0.1 percent, particularly in the case of the more effective catalysts and more reactive halogenated compounds. More than 10 percent is not required and is uneconomical. The preferred amounts range from about 0.5 percent to about 5 percent. Mixtures can be used.

The temperature to be used in carrying out the process of this invention can range from about 0°C. to about 100°C. At temperatures below about 0°C. the reaction is impractically slow, and temperatures substantially above 100°C. are undesirable because of increased problems of such as polymerization and formation of by-products. The most practical temperature range is from about 40°C. to about 85°C. when 3,4-dichloro-1-butene is being dehydrochlorinated to chloroprene. It is most convenient to use the autogenous pressures which develop normally under the reaction conditions. Higher or lower pressures can be used if desired.

The reaction is carried out in the absence of oxygen to avoid subsequent reactions of the dehydrohalogenated products formed. Also, it is highly desirable to add polymerization inhibitors such as phenothiazine, nitroso compounds and alkyl nitrites or other compounds which inhibit polymer formation if the reactants or products are polymerizable. These precautions are well known to those skilled in the art.

The alkaline material used in the process of this invention can be any alkali metal hydroxide. Sodium hydroxide is particularly preferred because of its ready availability. Other hydroxides which can be used include potassium hydroxide, lithium hydroxide, rubidium hydroxide, and cesium hydroxide.

The hydroxide (alkaline material) is used as an aqueous solution and the concentration of hydroxide in the solution may vary over a wide range, for example, from about 2 percent up to a saturated solution. The amine oxide catalysts are most effective at alkali metal hydroxide concentrations maintained from about 15 percent up to a saturated solution.

The mole ratio of hydroxide to chlorinated hydrocarbon can be as low as about 0.5:1. The optimum mole ratio of reactants to use will vary with effectiveness of the amine oxide being employed as catalyst and the reactivity of the compound being dehydrohalogenated. Higher mole ratios are needed with the less active catalysts and reactants. The upper limit of the mole ratio is not critical. In general, there is no advantage in using mole ratios above 20 to 1.

The process of this invention is useful for the preparation of chloroprene from 3,4-dichloro-1-butene and preparation of 2,3-dichloro-1,3-butadiene from 2,3,4-trichloro-1-butene or 1,2,3,4-tetrachlorobutane.

The process can be carried out by either a batch or a continuous process. The product formed can be recovered by conventional techniques. In producing chloroprene, for example, the reaction mass can be removed as a liquid, the aqueous and organic phases can be separated by conventional methods, and the chloroprene can be separated from dichlorobutene by distillation. Other methods will be within the scope of one skilled in the art.

By using the amine oxide catalyst in the invention process, improved reaction rates are obtained. Examples:

The following examples are representative and illustrate the invention process. All parts, percentages and proportions are by weight unless otherwise indicated.

EXAMPLES 1–21

A series of experiments is carried out using the following procedures and the conditions of Table 1.

The reactor is a flask fitted with an agitator and reflux condenser. Air is flushed from the flask with nitrogen, and an atmosphere of nitrogen is maintained in the flask. The reactants are charged to the reaction vessel, and the desired reaction temperature is maintained for the desired reaction time. A small amount of phenothiazine (about 0.005 to 0.1 percent based on dichlorobutene) is present as polymerization inhibitor. The organic phase of the reaction mass is separated and analyzed by vapor phase chromatography. Area percent analyses are converted to mole percent values from predetermined calibrations. The formula for percent conversion of dichlorobutene is Percent conversion = Moles of chloroprene × 100 /Moles of chloroprene plus moles of unreacted dichlorobutene The 3,4-dichloro-1-butene used is 97–98 percent pure. Molar amounts are not corrected for impurities. The concentration of sodium hydroxide is based on weight of sodium hydroxide plus weight of water. The concentration given in Table I is that of the sodium hydroxide solution initially charged to the reactor. Percentage of catalyst is based on weight of dichlorobutene (DCB). If the catalyst as obtained from the supplier is in diluted form, the percentage of catalyst given in Table I is that of the active ingredient. Table I summarizes the experiments and results.

(b) substituted aliphatic hydrocarbon radicals wherein the substitution consists of hydroxy, alkoxy, or carboxamide radicals in positions no closer to the N atom than the beta position, the alkyl group of a said alkoxy substituent radical containing from 1 to 20 carbon atoms and the carboxamide radical being selected from the group consisting of

TABLE I

| Example | Catalyst | | Catalyst Conc. % | NaOH Conc. % | Mole Ratio NaOH/DCB | Time min. | Temp. °C. | Conversion % | % %-Chloroprene* |
|---|---|---|---|---|---|---|---|---|---|
| 1 | $(CH_3)_3NO \cdot 2H_2O$ | | 1 | 50 | 10 | 30 | 60 | 14.2 | ND** |
| 2 | $(C_8H_{17})_3NO$ | (a) | 1 | 50 | 10 | 30 | 50 | 94 | 0.19 |
| 3 | $(CH_3)_2RNO$ R=lauryl | (b) | 1 | 20 | 1.1 | 30 | 60 | 12.2 | ND |
| 4 | " | | 1 | 50 (g) | 10 | 30 | 60 | 83.8 | ND |
| 5 | " | | 5 | 50 (g) | 10 | 30 | 60 | 87.6 | 0.40 |
| 6 | $(CH_3)_2RNO$ R=cetyl | (c) | 5 | 20 | 1.1 | 30 | 60 | 58.2 | 0.61 |
| 7 | " | | 1 | 50 (g) | 10 | 30 | 60 | 35.3 | ND |
| 8 | " | | 5 | 50 (g) | 10 | 30 | 60 | 77.4 | 0.37 |
| 9 | $(CH_3)_2RNO$ R=stearyl | (d) | 5 | 20 | 1.1 | 30 | 60 | 39.6 | 0.47 |
| 10 | " | | 1 | 50 (g) | 10 | 30 | 60 | 100 | 0.28 |
| 11 | " | | 5 | 50 (g) | 10 | 30 | 22 | 59.5 | ND |
| 12 | $(HOCH_2CH_2)_2RNO$ R="Coco", that is principally $C_{12}$ to $C_{16}$ alkyl | (e) | 1 | 20 | 1.1 | 30 | 60 | 33.8 | ND |
| 13 | " | | 5 | 20 | 1.1 | 30 | 60 | 68.9 | ND |
| 14 | " | | 0.1 | 50 (g) | 10 | 30 | 60 | 29.2 | ND |
| 15 | " | | 1 | 50 (g) | 10 | 30 | 22 | 73.6 | ND |
| 16 | " | | 1 | 50 (g) | 10 | 30 | 60 | 88.7 | ND |
| 17 | $(HOCH_2CH_2)_2RNO$ R=stearyl | (f) | 5 | 20 | 1.1 | 30 | 60 | 60.8 | 0.51 |
| 18 | " | | 0.1 | 50 (g) | 10 | 30 | 60 | 27.8 | ND |
| 19 | " | | 0.5 | 50 (g) | 10 | 30 | 60 | 100 | 0.25 |
| 20 | " | | 1 | 50 (g) | 10 | 30 | 22 | 48.1 | 0.12 |
| 21 | Pyridine 1-oxide | | 10 | 20 | 1.1 | 30 | 60 | 20.8 | ND |
| Comparison | None | | 0 | 20 | 1.1 | 30 | 60 | 5.6 | |
| Comparison | None | | 0 | 50 (g) | 10 | 30 | 60 | 2.46 | |

\* = Based on weight of 2-chloro-1,3-butadiene.
\*\* ND = Not Determined.
(a) Prepared by reacting trioctylamine with hydrogen peroxide in 95% ethanol
(b) "Ammonyx" LO supplied by Onyx Chemical Co.
(c) "Ammonyx" CO supplied by Onyx Chemical Co.
(d) "Conco" XA2S supplied by Continental Chemical Co.
(e) "Aromox" C/12 supplied by Armour Industrial Chemical Co.
(f) "Aromox" 18/12 supplied by Armour Industrial Chemical Co.
(g) Saturated with sodium chloride.

Similarly effective results, as achieved in the preceding representative examples, are obtained on substitution of corresponding amine oxides as heretofore described. Additional specific amine oxide catalysts that may be utilized to achieve substantially the same results include the following:

1. $C_{17}H_{33}CO$—NH—$CH_2CH_2$—$NO(C_2H_5)_2$ [diethyl(-2-oleoylaminoethyl)amine oxide]
2. $C_{12}H_{25}NH$—CO—$CH_2$—$NO(CH_3)_2$ (dodecylaminocarbonymethyl)dimethylamine oxide
3. N-alkylmorpholine N-oxide in which the alkyl groups are derived from coconut oil.

The embodiment of the invention in which an exclusive property or privilege is claimed are as follows:

1. In a process for dehydrochlorinating a chlorinated aliphatic hydrocarbon selected from the group consisting of 3,4-dichloro-1-butene; 2,3,4-trichloro-1-butene; and 1,2,3,4-tetrachlorobutane by reacting said chlorinated compound with an aqueous solution of an alkali metal hydroxide, the improvement of carrying out the process in the presence of from about 0.1 to about 10% by weight, based on the weight of said chlorinated compound, of an amine oxide which is either:

A. a tertiary amine oxide having the structure $R^1R^2R^3NO$, where $R^1$, $R^2$ and $R^3$ are the same or different radicals selected from (a) unsubstituted hydrocarbon radicals of 1 to 20 carbon atoms, or

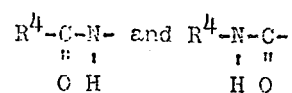

radicals, $R^4$ being alkyl or alkenyl hydrocarbons containing 1 to 20 carbon atoms, or (c) aliphatic radicals of the formula

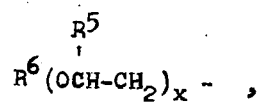

where $R^6$ is hydrogen or $R^1$ as defined in (a) or (b), $R^5$ is hydrogen or methyl, and $x$ is 2 to 15; or is B. a heterocyclic amine oxide selected from the group consisting of pyridine-N-oxide; N—$R^7$ piperidine-N-oxide; N—$R^7$—morpholine-N-oxide; and N-$R^7$-pyrrolidine-N-oxide, where $R^7$ is an aliphatic hydrocarbon radical of 1 to 20 carbon atoms.

2. The process of claim 1 wherein the alkali metal hydroxide is sodium hydroxide.

3. The process of claim 1 wherein said amine oxide is present in an amount from about 0.5 to about 5 percent.

4. In a process for dehydrochlorinating 3,4-dichloro-1-butene by reacting said 3,4-dichloro-1-butene with an aqueous solution of an alkali metal hydroxide, the improvement of carrying out the process at a temperature within the range of from about 40° to about 85°C. in the presence of from about 0.1 to about 10 percent, by weight, based on the weight of said 3,4-dichloro-1-butene, of an amine oxide which is either:

A. a tertiary amine oxide having the structure $R^1R^2R^3NO$, where $R^1$, $R^2$ and $R^3$ are the same or different radicals selected from (a) unsubstituted hydrocarbon radicals of 1 to 20 carbon atoms, or (b) substituted aliphatic hydrocarbon radicals wherein the substitution consists of hydroxy, alkoxy, or carboxamide radicals in positions no closer to the N atom than the beta position; the alkyl group of said alkoxy substituent radical containing from 1 to 20 carbon atoms and the carboxamide radical being selected from the group consisting of

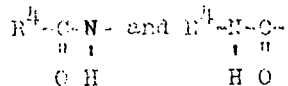

radicals, $R^4$ being alkyl or alkenyl hydrocarbons containing 1 to 20 carbon atoms, or (c) aliphatic radicals of the formula

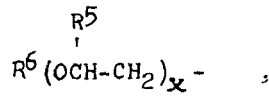

where $R^6$ is hydrogen or $R^1$ as defined in (a) or (b), $R^5$ is hydrogen or methyl, and $x$ is 2 to 15; or is B. a heterocyclic amine oxide selected from the group consisting of pyridine-N-oxide; N-$R^7$ piperidine-N-oxide; N-$R^7$-morpholine-N-oxide; and N-$R^7$-pyrolidine-N-oxide, where $R^7$ is an aliphatic hydrocarbon radical of 1 to 20 carbon atoms.

5. The process of claim 4 wherein said amine oxide has at least one radical which contains an aliphatic chain of at least 8 carbon atoms.

6. The process of claim 4 wherein the amine oxide is $(C_8H_{17})_3NO$.

7. The process of claim 4 wherein the amine oxide is stearyl dimethylamine oxide.

8. The process of claim 4 wherein the amine oxide is bis(2-hydroxyethyl) stearylamine oxide.

* * * * *